Sept. 11, 1956     S. TIERNEY, JR     2,762,427
WELDING TORCH
Filed July 7, 1953     2 Sheets-Sheet 1
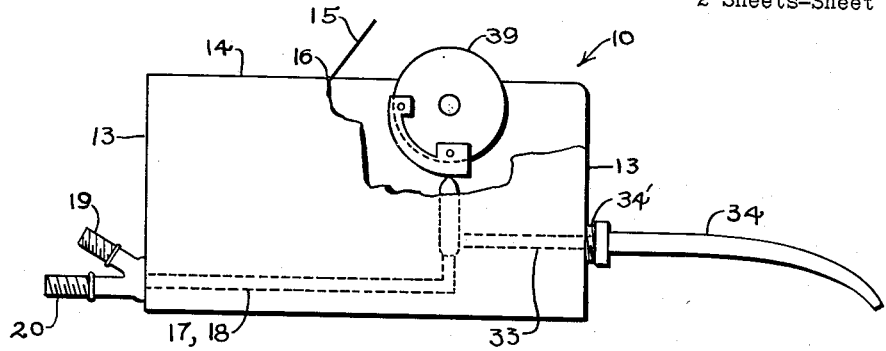
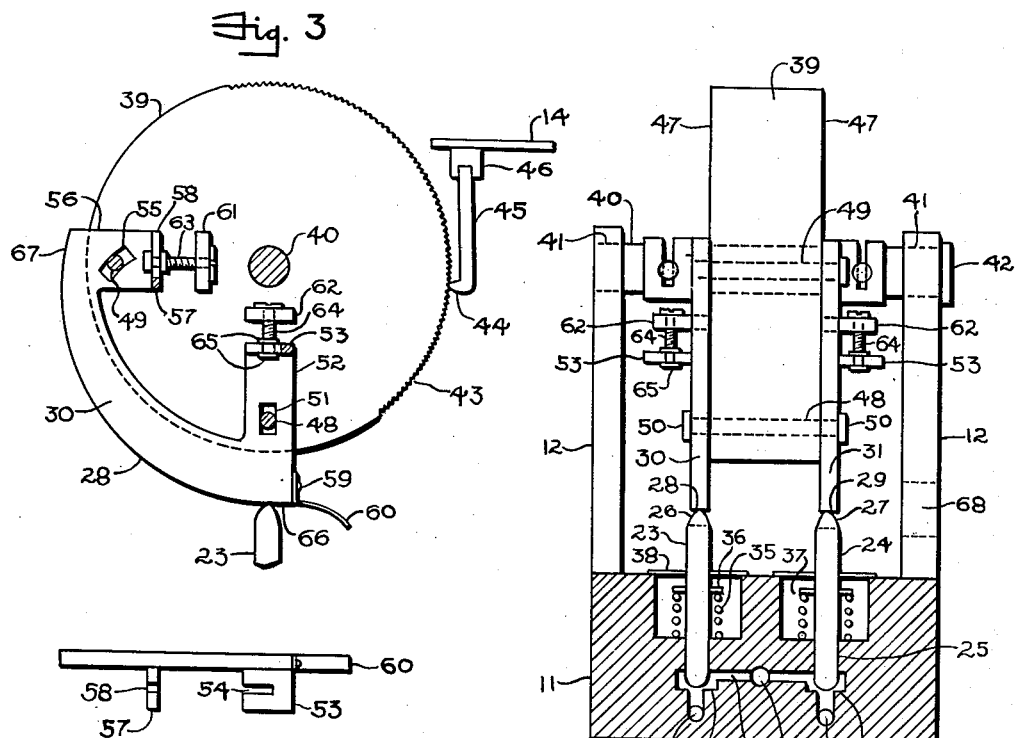
S. TIERNEY JR.    INVENTOR.
BY S. Tierney Jr Sept. 11, 1956  S. TIERNEY, JR  2,762,427
WELDING TORCH
Filed July 7, 1953  2 Sheets-Sheet 2
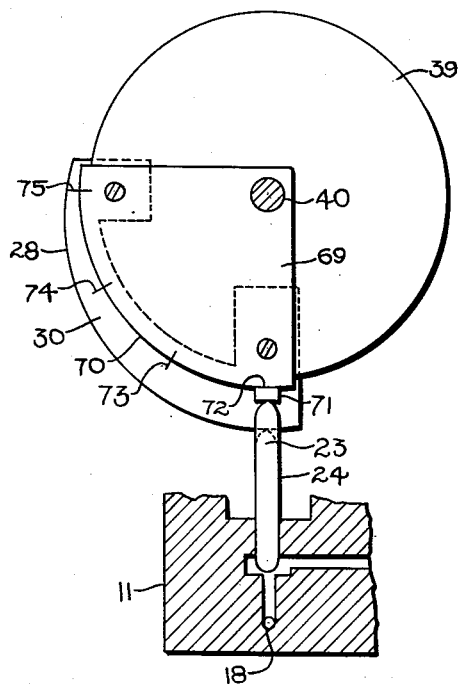
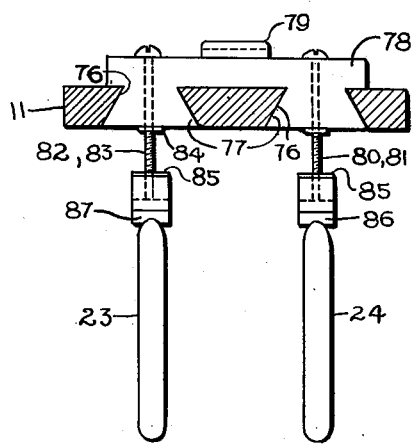
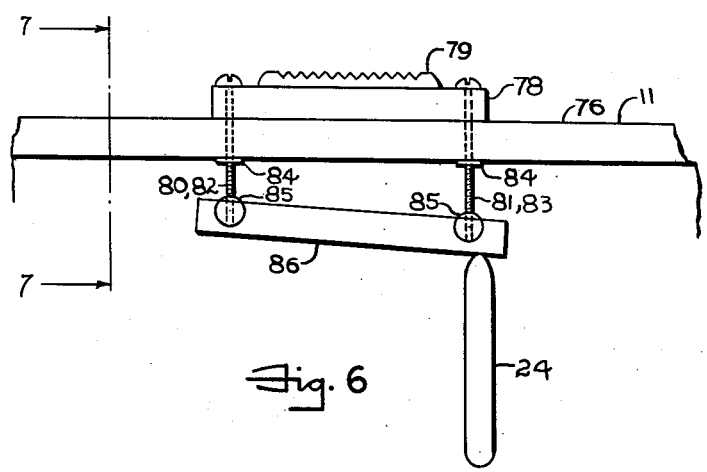
S. TIERNEY JR. INVENTOR.
BY S. Tierney Jr

United States Patent Office 2,762,427
Patented Sept. 11, 1956

2,762,427

WELDING TORCH

Samuel Tierney, Jr., Chula Vista, Calif., assignor to Rohr Aircraft Corporation, Chula Vista, Calif., a corporation of California Application July 7, 1953, Serial No. 366,556

16 Claims. (Cl. 158—27.4)

This invention relates to a heating or welding torch capable of heating metals such as bronze, aluminum, carbon steel, alloy steels high in nickel, chromium, manganese and other metals to a welding temperature.

Such torches are in extensive use and are usually provided with two shut off screw threaded main valves which may be opened to the proper extents to provide a flame at the torch tip of the proper size for the work in hand. With such torches burning acetylene gas in an oxygen atmosphere, this usually requires movement of the valve controlling the acetylene by a different amount than the valve controlling the oxygen even though the two control valves are designed to be of the same size and shape. To secure the best welding, the two valves must be precisely adjusted and this requires a considerable degree of experience on the part of the operator. If high carbon steel, for example, is being welded and the oxygen control valve is adjusted to admit too much oxygen, this has a bad effect on the weld in two ways. The excess oxygen above that necessary for complete combustion of the acetylene is cool when it enters the flame and travels through the flame carrying heat away from it thus lowering its temperature. This excess oxygen, being highly heated in the flame, oxidizes the carbon particles and compounds in the steel with which it comes in contact and thus decreases the carbon content of the steel, thereby weakening it in the region of the weld. On the other hand, if the acetylene control valve is set to admit an excess of acetylene when welding commercial aluminum alloys, a deposit of unconsumed carbon formed in the sooty flame settles on the metal in the region of the weld and on the welding rod being used and tends to prevent the metal of the two parts being welded from coalescing. The excess acetylene supplied also carries heat away from the flame and lowers its temperature. It is also time consuming to effect the precise adjustment of these control valves every time the torch is shut off and reused.

It has been proposed, as disclosed in United States Patent No. 2,191,078, to provide between these main valves above mentioned and the torch tip a pair of auxiliary quick shut-off valves which can be quickly closed and opened to turn the flame on or off. These auxiliary valves are not designed to determine the composition of the gas mixture supplied to the flame, the relative amounts of the two gases supplied to it being predetermined by the setting of the main valves. When a welding flame of different size and heating capacity is desired, the main control valves must be individually adjusted to provide the proper acetylene and oxygen flows. The addition of such quick shut-off valves to a welding torch adds substantially to its cost and an object of the present invention is to provide means whereby the main valves which control the two gases to change the size of the flame also shut them off when the flame is not needed.

Another object of the invention is to provide a single control member convenient to the operator arranged to adjust the valves which control the flow of acetylene or other fuel gas and oxygen to provide welding or heating flames of different sizes and of the desired composition. The control member preferably has an exposed portion which may be moved by one finger of the operator to control the size of the flame.

A further object of the invention is to provide adjustable means associated with the control member moved by the operator whereby the movements of the valves which control the two gases may be independently controlled. The adjustable means provided automatically assures the delivery of the proper gas mixture to the flame at each setting of the control member and compensates for manufacturing tolerances of the moving parts of the torch.

Further objects will become apparent as the description of the torch proceeds. For a better understanding of the invention, reference is made to the accompanying drawings, in which:

Figure 1 is a side view, partly diagrammatic and with portion broken away, of a welding torch embodying the invention;

Figure 2 is an enlarged view partly in section through the body of the torch and showing the control means for operating the valves;

Figure 3 is a side view partly in section of the valve control means of Figure 2;

Figure 4 is a top view of one of the valve control cams of Figure 3;

Figure 5 is a view partly in section of a means for determining the shape of a control cam;

Figure 6 is a side view, partly diagrammatic, of a modified form of the invention and;

Figure 7 is a sectional view taken on line 7—7 of Figure 6.

Referring to Figures 1 and 2, the invention is shown embodied in a heating or welding torch 10 having a solid metal body 11 having upstanding side walls 12, end walls 13 and top 14 which provide a casing around the operating control means. The top wall 14 has a small door 15 hinged at 16 which may be opened for a purpose to be later described. Body 11 has two substantially parallel cylindrical ducts 17, 18 to the ends of which a fuel gas such as acetylene, hydrogen or other gas capable of generating welding temperatures and oxygen are supplied through the nozzles 19, 20. The oxygen supplied to nozzle 20 is kept at a substantially constant pressure of the order of 12 p. s. i. and the acetylene supplied to nozzle 19 kept at a substantially constant pressure of 10 p. s. i. by means of reducing control valves (not shown) in a well known manner. At their ends ducts 17, 18 have vertical portions provided with valve seats 21, 22 for a pair of control valves 23, 24 adapted to control the flow of the gases and to shut them off. The valves have cylindrical stems slidable in cylindrical bores 25 in body 11 and tapered top ends 26, 27 which provide point contact with curved cam faces 28, 29 of a pair of metal cams 30, 31 which may be stamped out of flat sheet metal. After passing past the valves, the gases enter a mixing chamber 32 where the gases mix together and then pass through a duct 33 in body 11 which communicates with the opening through tip 34 from which the flame issues. As shown tip 34 has a screw threaded attachment 34' with the end of body 11 from which it may be readily detached, as shown in the aforementioned patent. Instead of mixing immediately after passing through the valves, the gases may pass separately through two ducts in body 11 to a mixing chamber in the inlet end of tip 34, substantially as shown in the aforementioned patent. The valves are preferably of the same size and shape and each is biased upwardly by a helical compression spring 35 whose upper end engages a ring 36 secured to the valve stem and whose lower end engages the bottom wall of a cylindrical chamber 37 formed in body 11. Each chamber is sealed at the top by a flexible circular diaphragm 38 connected to the valve stem and having its peripheral portion connected to body 11.

Cams 30 and 31 are rotated together by a generally cylindrical control knob 39 rotatably mounted on a horizontal shaft 40 having its ends disposed in holes 41 bored in walls 12. The shaft has an enlarged head 42 at one end by means of which it may be withdrawn to remove the control knob and its attached cams when door 15 is opened. Shallow ridges 43 are cut across the face of knob 39 to provide good frictional grip with the operator's finger and to also permit the knob to be held at any desired setting by a latch 44 (Fig. 3) formed at one end of a short leaf spring 45 whose opposite end is attached to a post 46 projecting from wall 14. The ridges 43 may extend around the entire periphery of knob 39, if desired.

Each of the cams 30, 31 has a flat face which is slidable along an end face 47 of knob 39 and the cams are held in engagement with said faces by a pair of cylindrical pins 48, 49 provided with heads 50 which engage the exposed faces of the cams. Pin 48 passes through a radial slot 51 formed in an arm 52 of the cam, this arm terminating in a projecting finger 53 which has a slot 54 extending parallel to knob face 47. Pin 49 passes through a short circular slot 55 formed in an arm 56 extending in from the other end of the cam, the axis of pin 48 being the center of curvature of slot 55. At its inner end arm 56 terminates in a projecting finger 57 which has a vertical slot 58. Secured to the lower end of each cam by one or more pins 59 is a curved spring 60 which serves to close its valve in a manner to be described.

Means is provided for independently adjusting both ends of each cam with reference to the axis of shaft 40, the means illustrated comprising a pair of lugs 61, 62 integral with knob 39 and each having a threaded hole to receive the adjusting screws 63, 64. The head of each screw may have two or more intersecting slots to receive the tip of an offset screw driver for easy adjustment of them. Each screw has a pair of spaced apart circular projecting flanges 65 and a smaller circular portion between the flanges which is seated in slot 54 or 58.

Cam 30 may have such a radius at region 66 that in the position shown in Fig. 3, valve 23 is open sufficiently to provide enough acetylene or other fuel gas through duct 17 for a welding flame of the minimum size required with a tip 34 of small size, for example, a commercial No. 1 tip. The cam radius in the region 67 may be selected to open valve 23 enough to provide a welding flame of the maximum size which the tip will furnish when knob 39 is rotated through 90 degrees. The cam face 28 may then be cut with a uniform rise between these two end radii.

The proper shape of cam face 29 of oxygen control cam 31 may then be determined as follows. A torch has a window 68 cut in wall 12 directly in front of valve 24 (see Fig. 2) and cam 30 is fastened to one face of knob 39 in the position shown in Fig. 3. On the opposite face of the knob a flat test plate 69 is fastened (see Fig. 5) this plate having holes to snugly receive shaft 40 and pins 48, 49 and a curved face 70 of constant radius, for example 0.40 inch, about the axis of shaft 40. With control knob 39 set in the position shown in Fig. 5 for the smallest welding flame, a narrow thickness gage 71 is inserted between the top of valve 24 and face 70, the thickness of this gage being such as to cause valve 24 to supply an excess of oxygen to the flame. Thin thickness gages are then successively inserted between the gage 71, and the valve until valve 24 is passing just the right amount of oxygen so that the flame is non-oxidizing and generating the maximum welding heat. The proper oxygen flow may be determined by readings of flow meters inserted in the lines which supply the gases to nozzles 19, 20 or by a visual inspection of the welding flame by an experienced welder. Assuming the combined thickness of the gages to total 0.200 inch, then the radius of cam 31 at position 72 is 0.600 inch. Knob 39 is then rotated counterclockwise say 30° to bring region 73 over valve 24, valve 23 simultaneously raising to admit more acetylene. Thickness gages are again inserted between the top of valve 24 and face 70 until the flame is neutral (non-oxidizing). Assuming the gage thickness to be 0.197 inch, the radius of cam 31 at position 73 is 0.597 inch. This process is repeated by turning knob 39 twice more through 30 degrees and the radius of the cam determined for positions 74 and 75, position 75 giving substantially the maximum welding flame from this torch tip. The radii so determined may be, for example, 0.593 inch and 0.588 inch. A cam 31 is now constructed whose face 29 has a radius of 0.600; 0.597; 0.593 and 0.588 inch at points 72, 73, 74 and 75 respectively. The plate 69 is then removed from knob 39 and cam 31 fastened to it. Its adjusting screws 63, 64 are then adjusted to set the ends of the cam at the proper distances from the axis of shaft 40. Window 68 can be replaced and the torch is ready for use. To change the length and heating capacity of the flame the operator has merely to place a finger of either hand on the periphery of knob 39 and rotate it a suitable amount to secure the desired flame. At each setting of the knob, valve 24 is automatically opened just enough to pass the correct amount of oxygen into the flame so that it is neutral (non-oxidizing). With cams 30 and 31 properly set by the foreman of the welding department, there is no occasion for the torch operator to change the adjustment of any valve. To change the length and heating capacity of the flame the torch operator merely rotates control knob 39 the proper amount. While cams 30 and 31 are shown as having an angular extent of a little over 90°, it will be understood that in certain torches they may extend through only 45 to 60 degrees while in others a length somewhat greater than 90° may be desirable. When the above arrangement is used with a single torch tip, a very sensitive and exact control of the flame size and structure is secured. To shut off the flame, control knob 39 is turned clockwise from the position shown in Fig. 3 until springs 60 engage and close both valves 23 and 24. Latch 44 holds knob 39 in any position to which it is adjusted.

The control arrangement described is capable of compensating for certain manufacturing tolerances when a large number of similar torches are made. For example, if a valve 24 has a length 0.002 inch above normal, the ends of cam 31 may be moved in toward the axis of shaft 40 by this same amount by adjusting its screws 63 and 64. Other tolerances requiring a slight change in the rise of either cam may be compensated for by adjusting screw 63 or 64 as required.

If a less exact control is preferred and it is desired to use also a larger tip as, for example, a No. 2 tip, adapted to screw onto fitting 34[1], the uniform rise of face 28 of cam 30 is increased so that valve 23 in its top position passes enough acetylene to supply the largest flame desired from No. 2 tip. The curvature of the face 29 of cam 31 is then determined by using thickness gages in the manner above described, the radii at points 75 and 74 being determined when No. 2 tip is attached and the radii at points 73 and 72 determined when the smaller tip (No. 1) is attached. The torch could then furnish welding flames suitable for welding sheet metals of widely varying thickness by the operator screwing on the proper tip and adjusting knob 39. At each setting, a non-oxidizing flame of substantially the maximum heating capacity is assured. By increasing the rise of cam faces 28 and 29 still further, still larger welding tips may be provided for as will be understood.

One knob 39 may be provided having cams for controlling the flame from a single tip and by opening door 15 and sliding out shaft 40 by pulling on its head 42 (Fig. 2), the knob with its attached cams may be removed from the torch. Another similar knob may now be inserted having cams designed to control the flame from the same tip and also one or two larger tips. Upon pushing in shaft 40 and closing door 15, the torch is again ready for operation.

Figures 6 and 7 show a modified form of construction for operating the control valves 23, 24 of the torch 10. In this case the body 11 is provided with a straight trackway 76 in which a pair of tapered guides 77 depending from a cam supporting block 78 are slidable. Block 78 has a central upstanding finger grip 79 which is knurled to be easily pushed by a finger of the operator. Block 78 is drilled to receive the shanks of four screws 80, 81, 82 and 83, each screw having an annular collar 84 secured to it at the bottom face of the block. Screws 80 and 81 enter a pair of threaded holes provided in cylindrical pins 85 which are seated for rotation in a pair of transverse holes extending across a cam 86. Screws 82 and 83 enter threaded holes in cylindrical pins 85 seated for rotation in a pair of transverse holes extending across a second cam 87.

It will be apparent that by adjusting either screw 80 or 81, the rise of cam 86 may be changed to control the movement of valve 24 and that by adjusting both screws 80 and 81, the entire cam may be raised or lowered without changing its rise. Similar adjustments may be made to cam 87 by turning either one or both screws 82, 83. After both cams have been set in a manner similar to that above described in connection with Fig. 5, to change the size of the flame, the operator places a finger on finger grip 79 and slides block 78 along its guideway 76, the springs 35 (Fig. 2) causing valves 23, 24 to ride along cams 87, 86 and control the flow of the gases. A neutral, non-oxidizing flame is thus assured at each setting of the control. The springs 60 attached to the lower ends of cams 86, 87 to close the valves are omitted from Figs. 6 and 7 for clarity.

In both illustrated forms of the invention, by supplying the gases through the usual rubber tubes to nozzles 19 and 20, a portable torch is provided of light weight that may be held and controlled entirely by one hand of the operator. As the welding proceeds over a workpiece having parts of different thickness, the operator may quickly change the flame size without withdrawing the flame from the work and without damaging the weld by an oxidizing flame as often happens with the usual commercial torch having two separate control valves.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A welding torch comprising, in combination: a body having a pair of ducts adapted to supply fuel gas and oxygen respectively; valves operatively associated with said ducts to control the flow of the gases therethrough; a pair of movable members having cam faces arranged to move said valves; a single control member movable through a considerable range of movement connected to said movable members; adjustable means carried by said control member and operatively associated with one or more of said movable members whereby the extent of movement of one valve with reference to that of the other for a given movement of the control member may be changed; and a mixing chamber connected to said ducts to receive the gases passed by said valves.

2. A welding torch having a mixing chamber which supplies mixed gases to the orifice of a tip; a pair of ducts arranged to supply fuel gas and oxygen separately to said mixing chamber; two valves operatively associated with said ducts to gradually increase the flow of both gases therethrough simultaneously; a cam having a uniform rise arranged to gradually move one of said valves; a second cam arranged to gradually move the other of said valves simultaneously with the movement of said one valve; a single movable control member capable of being moved by a finger of the operator connected to both cams; and adjustable means carried by said control member for changing the rise of said second cam.

3. A welding torch as claimed in claim 2; in which said adjustable means comprises separately adjustable screw threaded members connected to said second cam near the ends thereof.

4. A welding torch having a mixing chamber; a duct arranged to supply fuel gas to said chamber; a second duct adjacent said first duct arranged to supply oxygen to said chamber; a valve operatively associated with said first duct to decrease and stop the flow of gas therethrough; a second valve operatively associated with said second duct to decrease and stop the flow of gas therethrough; a movable control member capable of being moved by a finger of the operator; a pair of cams supported by said control member and arranged to gradually move said valves in the same direction simultaneously to decrease the flow of the gases; and a pair of screws supported by said control member and connected to the ends of one of said cams to adjust the rise thereof.

5. A welding torch having a body provided with a pair of small ducts arranged to supply fuel gas and oxygen separately to a mixing chamber; valves operatively associated with said ducts to control the flow of the gases therethrough; a control member slidable along said body; a pair of cams depending from said control member and arranged to gradually move said valves in the same direction; and adjustable threaded means supported by said control member for regulating the rise of one or both of said cams.

6. A welding torch as claimed in claim 5; in which said adjustable threaded means comprises a pair of screws connected to the ends of each of said cams whereby either end of either cam may be independently adjusted.

7. A welding torch having a body provided with a pair of adjacent small ducts arranged to convey fuel gas and oxygen separately to a mixing chamber; valves in said ducts to control the flow of the gases therethrough; a rotatable control member supported for rotation by said body; a pair of cams supported by said control member and having curved faces adapted to move said valves simultaneously in the same direction in response to the rotation of said control member through a predetermined angle; and two adjustable members connected to the ends of one of the cams arranged to move either end of said cam towards the axis of rotation of the control member.

8. A welding torch having a body provided with a pair of adjacent small ducts arranged to convey fuel gas and oxygen separately to a mixing chamber; valves in said ducts to control the flow of the gases therethrough; a narrow control member having plane parallel end faces; means carried by said body for supporting said control member for rotation about an axis normal to said end faces; two cams having curved cam faces arranged to control the setting of said valves; means for supporting said cams against the end faces of said control member; and adjustable means carried by said control member for moving the end of at least one cam away from the axis of rotation.

9. A welding torch having a body provided with a pair of adjacent small ducts arranged to convey fuel gas and oxygen separately to a mixing chamber; valves operatively associated with said ducts to control the flow of the gases therethrough; cams composed of rigid material; a movable control member connected to said cams and capable of being moved by a finger of the operator, movement of said control member of a predetermined amount in one direction causing said cams to only partially close said valves; and resilient means supported by said cams arranged to engage and close said valves in response to further movement of said control member in the same direction.

10. A welding torch as claimed in claim 9; in which said resilient means comprises a pair of curved springs having portions abutting the ends of said cams.

11. A welding torch having a tip for directing flame and a mixing chamber which supplies mixed gases to said tip; a duct arranged to supply fuel gas to said chamber; a second duct arranged to supply oxygen to said chamber; a valve having a head in said first duct; a cam in engagement with said valve; a movable control member connected to said cam, movement of said control member in one direction causing said valve head to pass decreasing amounts of fuel gas through said first duct to said mixing chamber; a second valve having a head in said second duct; a second cam connected to said control member; and means for so adjusting the position of one of said cams with reference to the other cam that said second cam causes the head of said second valve to pass, at each setting of said control member, just enough oxygen through said second duct to provide a non-oxidizing flame from the tip.

12. A welding torch having a tip; a mixing chamber for delivering a combustible mixture of acetylene and oxygen to said tip to produce welding flames of different sizes; a duct arranged to supply acetylene to said chamber; a first valve for controlling the flow of acetylene through said duct; a second duct arranged to supply oxygen to said chamber; a second valve for controlling the flow of oxygen through said second duct; a movable control member positioned to be adjusted by a finger of the operator; a cam connected to said control member and arranged to move said first valve to provide flames of decreasing size from the torch tip; a second cam connected to said control member and arranged to move said second valve to decrease the flow of oxygen through said second duct; and two separate adjusting means connected to the ends of said second cam to regulate the rise of said second cam.

13. A welding torch having a tip; mixing chamber for delivering a combustible mixture of acetylene and oxygen to said tip to produce welding flames of different sizes; a duct arranged to supply oxygen to said chamber; a first valve for controlling the flow of oxygen through said duct; a second duct arranged to supply acetylene to said chamber; a second valve for controlling the flow of acetylene through said second duct; a movable control member capable of being adjusted to several control positions by a finger of the operator; a curved cam connected to said control member and arranged to move said first valve to provide oxygen jets of decreasing size from the torch tip; a second cam connected to said control member and arranged to move said second valve to decrease the flow of acetylene through said second duct; and separate adjusting means supported by said control member and connected to the ends of said second cam to so position said cam on the control member that successive settings of said control member provide non-oxidizing welding flames of decreasing size.

14. A torch having a body and a tip, said body having a guideway; a mixing chamber for delivering a combustible mixture of fuel gas and oxygen to the orifice of said tip to produce heating flames of different sizes; a duct arranged to supply fuel gas to said chamber; a first valve for controlling the flow of fuel gas through said duct; a second duct arranged to supply oxygen to said chamber; a second valve for controlling the flow of oxygen through said second duct; a control member slidable along said guideway and having a portion exposed for engagement and actuation by a finger of the operator; a pair of cams connected to said control member and arranged to gradually and simultaneously move said valves by amounts which provide non-oxidizing heating flames of different sizes in response to movement of said control member along the guideway.

15. A torch having a body and a tip; a control member pivoted for rotation on said body and exposed for operation by a finger of the operator through an acute angle, said control member having parallel end faces; a mixing chamber for delivering a combustible mixture of fuel gas and oxygen to said tip to produce heating flames of different sizes; a duct arranged to supply fuel gas to said chamber; a first valve for controlling the flow of gas through said duct; a second duct arranged to supply oxygen to said chamber; a second valve for controlling the flow of oxygen through said second duct; a pair of cams secured to the end faces of said control member and arranged to gradually and simultaneously move said valves by amounts which provide a non-oxidizing heating flame of different thermal capacity at each setting of the control member.

16. A heating torch comprising: a tip having an outlet of predetermined area; a mixing chamber for delivering a combustible mixture of fuel gas and oxygen to said tip to produce a flame; a duct arranged to supply fuel gas to said chamber; a valve arranged to control the flow of fuel gas through said duct; a cam in engagement with said valve; a second duct arranged to supply oxygen to said chamber; a second valve arranged to control the flow of oxygen through said second duct; a cam in engagement with said second valve; a control member supported for adjustment between two end positions; a plurality of adjustable means carried by said control member for securing said cams in positions on said control member so that upon adjustment of said control member to a position intermediate said end positions, the maximum flow of gases through the tip outlet is secured to support a non-oxidizing flame of the maximum heating capacity of the tip.

References Cited in the file of this patent

UNITED STATES PATENTS

| 1,124,871 | Day | Jan. 12, 1915 |
| 1,197,721 | Drago | Sept. 12, 1916 |

FOREIGN PATENTS

| 586,389 | France | Jan. 5, 1925 |